United States Patent
Kanefsky et al.

(10) Patent No.: US 7,653,744 B2
(45) Date of Patent: Jan. 26, 2010

(54) METHOD AND APPARATUS FOR SHARING WIRELESS CONTENT

(75) Inventors: Steven T. Kanefsky, Redmond, WA (US); Michael Kocheisen, Menlo Park, CA (US); David P. Kormann, Morristown, NJ (US); Bernard S. Renger, New Providence, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 2160 days.

(21) Appl. No.: 09/801,635

(22) Filed: Mar. 9, 2001

(65) Prior Publication Data

US 2002/0026500 A1    Feb. 28, 2002

Related U.S. Application Data (60) Provisional application No. 60/211,089, filed on Jun. 12, 2000.

(51) Int. Cl.
*G06F 15/16* (2006.01)
(52) U.S. Cl. .................. 709/245; 709/229; 709/217; 455/445; 370/338
(58) Field of Classification Search .............. 709/245, 709/217, 229; 370/338, 352; 455/445
See application file for complete search history.

(56) References Cited

U.S. PATENT DOCUMENTS

| | | | |
|---|---|---|---|
| 5,061,738 A * | 10/1991 | Solomon et al. ............. 523/100 |
| 5,812,776 A * | 9/1998 | Gifford ........................ 709/217 |
| 5,870,549 A | 2/1999 | Bobo, II |
| 5,895,471 A | 4/1999 | King et al. |
| 6,061,738 A * | 5/2000 | Osaku et al. ................ 709/245 |
| 6,115,611 A | 9/2000 | Kimoto et al. |
| 6,170,014 B1 * | 1/2001 | Darago et al. ............... 709/229 |
| 6,185,535 B1 * | 2/2001 | Hedin et al. ................. 704/270 |
| 6,334,056 B1 * | 12/2001 | Holmes et al. .............. 455/445 |

(Continued)

FOREIGN PATENT DOCUMENTS

GB    2 341 759 A    3/2000

OTHER PUBLICATIONS

Marketing material http://www.planetit.com/techcenters/docs/mobile_wireless/expert/PIT20000305S0005/1 Printed out on Dec. 7, 2000.

(Continued)

*Primary Examiner*—Tammy T Nguyen
(74) *Attorney, Agent, or Firm*—Woodcock Washburn LLP

(57) ABSTRACT

Embodiments of the invention allow the convenient transmission of URLs or content corresponding to URLs from a WAP/i-mode-enabled mobile device to any other device across a network. In an embodiment, a URL corresponding to content accessed by WAP/i-mode-enabled mobile device is transmitted to an application server. The WAP/i-mode-enabled mobile device further transmits a destination address for the content to the application server. The application server then transmits the URL corresponding to the content to the destination address. The URL can then be used to render the corresponding content at the destination address.

In another embodiment, a URL corresponding to content accessed by the WAP/i-mode-enabled mobile device is transmitted to an application server. The WAP/i-mode-enabled mobile device further transmits a destination address for the content to the application server. The application server then fetches the content corresponding to the URL and transmits the content to the destination device.

42 Claims, 3 Drawing Sheets

U.S. PATENT DOCUMENTS

| | | | |
|---|---|---|---|
| 6,356,905 B1 * | 3/2002 | Gershman et al. | 707/10 |
| 6,594,347 B1 * | 7/2003 | Calder et al. | 379/88.01 |
| 6,661,784 B1 * | 12/2003 | Nykanen | 370/338 |
| 6,711,156 B1 * | 3/2004 | Gourraud | 370/352 |

OTHER PUBLICATIONS

Unwired Planet, Inc; UP.SDK Getting Started Guide, version 3.1 for HDML; Jan. 19, 1999, pp. 1-32, Redwood City, CA., USA.

*Wireless Application Protocol Push Architectural Overview*, Version 08—Nov. 1999, Wireless Application Protocol Forum, Ltd. 24 pp., XP-002155620.

*Wireless Application Protocol Wireless Application Environment Overview Version 1.3*, WAP-195-WAE Overview, Verson 29—Mar. 2000, Wireless Application Protocol Forum, Ltd. 23 pp., XP-002155622.

Leavitt, Neal, *Will WAP Deliver the Wireless Internet?*, Technology News, pp. 16-20, May 2000, XP000948629.

* cited by examiner

METHOD AND APPARATUS FOR SHARING WIRELESS CONTENT

CROSS-REFERENCE TO RELATED APPLICATIONS

This application claims priority from U.S. Provisional Application Ser. No. 60/211,089, filed on Jun. 12, 2000, which is incorporated by reference herein.

BACKGROUND OF THE INVENTION

The present invention relates to the field of transmission of content, and more particularly relates to the field of the transmission of content from mobile devices to other devices through a network.

The increasing use of mobile devices connected to each other and other devices through networks has led to searches for solutions to problems associated with communication between these devices. One type of common mobile device employs the Wireless Application Protocol ("WAP") to allow the communication of information to and from the mobile device.

The WAP is a secure protocol that allows users real-time access to information using handheld wireless devices, including mobile phones, pagers, two-way radios, smartphones and other devices. WAP supports most wireless networks, including CDPD, CDMA, GSM, PDC, PHS, TDMA, FLEX, ReFLEX, iDEN, TETRA, DECT, DataTAC, and Mobitex. WAP is supported by nearly all current operating systems (e.g., PalmOS, EPOC, Windows CE, FLEXOS, OS/9, and JavaOS).

WAP devices having displays and access to the Internet run microbrowsers which are browsers having small file sizes that are able to operate under the low memory constraints of handheld devices and the low-bandwidth constraints of most wireless networks supporting handheld devices. The Wireless Markup Language ("WML"), which has been specially created for small screens and navigation without a keyboard, is the markup language for WAP.

WAP also supports WMLScript, which is a simplified version of JavaScript that minimizes demands on memory and the processor. WML and WMLScript together constitute the Wireless Application Environment ("WAE"). In this document, a device employing a microbrowser and supporting WML and/or WMLScript will be denoted using the term "WAPenabled device."

WML is the analog in WAP of Hypertext Markup Language ("HTML"), which is used to create and present content on the World Wide Web ("WWW" or "Web"). A WML file, which is analogous to a Web page in HTML, is structured as a "deck" of one or more "cards". A card corresponds to an atomic unit of displayable information in WML. A WML file (i.e., a deck) is referenced using a Uniform Resource Locator ("URL"), similar to the way HTML files (e.g., Web pages) are referenced. The user interface for WML is created using a deck of cards. WML also includes methods for implementing access control for content.

The NTT DoCoMo i-mode is another protocol that allows users real-time access to information using handheld wireless devices, including mobile phones, pagers, two-way radios, smartphones and other devices. The NTT DoCoMo i-mode ("i-mode") service is not based on WAP; instead of WML, i-mode uses a simplified version of HTML called Compact HTML ("cHTML"). cHTML is actually a subset of HTML that is intended for devices with slower connection speeds, like mobile devices. In particular, the resource intensive abilities of HTML (e.g., rendering tables and frames) have been left out of cHTML. Thus, cHTML allows i-mode web pages to download more quickly to mobile devices running an i-mode microbrowser ("i-mode-enabled device").

Because i-mode web sites are written using versions of HTML, such sites can also be accessed and rendered by devices running ordinary Internet browsers. This contrasts with the situation for WAP web sites, which cannot be rendered by devices running ordinary Internet browsers.

When a user of an i-mode-enabled device bookmarks a web page, the title of the web page becomes the title of the bookmark. Because i-mode was originally designed for use in Japan, i-mode-enabled devices (including the microbrowser for such devices) display Japanese text, although English text is also supported. The i-mode service uses S-JIS character encoding, GIF formatted images, and half-width kana characters. The microbrowsers usually have a title bar with icons at the top of a LCD screen. The user can manipulate the icons to access various services. A text screen below the title bar can display text messages and data.

The term "WAP/i-mode-enabled device" will be used to denote a device that is WAP-enabled and/or i-mode-enabled. From this point on, the term "deck" will be used to denote a WAP deck, and/or an i-mode web page. The term "card" will be used to denote an atomic unit of displayable information in WAP and/or i-mode.

One deficiency of WAP/i-mode-enabled devices is that they do not allow for a convenient way of sharing content with other devices on the network. One known method for sharing content on a WAP/i-mode-enabled device requires that the user transmit the URL corresponding to displayed content to another user within a message. If an e-mail message were used to transmit the URL, the user would have to manually type the URL into the e-mail message using the microbrowser. In addition to expending effort in having to manually enter the URL, the user generally is not able to observe the content corresponding to the URL and manually enter the URL at the same time. Also, by composing a message for manual entry of the URL, the user will have had to access another URL (i.e., the URL associated with composing e-mail messages) and will probably no longer see the displayed content for the URL she wanted to send. Alternatively, if a voice-mail message were used to transmit the URL, the user would have to dictate the URL into the voice-mail message. Other media for transmitting the URL also require the user to manually insert the URL into a message. Such manual insertion is inconvenient and difficult using a microbrowser. WAP/i-mode-enabled devices do not have any kind of copy and paste capability, so several manual steps would be needed to transmit the URL or the URL content shown on the device.

Additionally, even if the URL corresponding to content displayed on a WAP/i-mode-enabled device is transmitted in this manner, the recipient will only be able to access the most current content corresponding to the URL, because the content may be changed by the entity controlling the Web site corresponding to the URL. For example, if the content corresponding to the URL is updated or changed during the period beginning with the time that the URL is sent in a message by the user of the WAP/i-mode-enabled device and ending with the time the recipient accesses the URL, then the recipient will access content different from that originally intended to be transmitted by the user of the WAP/i-mode-enabled device. In many cases, the user may desire that the recipient view the same content that the user views at a given instant of time.

The Excite service (on the Internet at www.excite.com) has a WAP portal that allows WAP-enabled devices to access various content sources including general news, business news, sports news, etc. The Excite QuickCut feature allows users of WAP-enabled devices to send messages including content in WML cards or decks to multiple e-mail addresses. However, the Excite QuickCut feature requires modification of the WML card or deck to include a QuickCut link at the bottom of the WML card or deck. Thus, for the user to be able to send content corresponding to a URL using the Excite QuickCut feature, the content corresponding to the content must have been modified to include the QuickCut feature. Because this modification must be done for each and every URL for which the corresponding content is desired to be sent, this method is cumbersome and inadequate. Furthermore, the Excite QuickCut feature does not allow the transmission of the URL (as opposed to the content corresponding to the URL) or a modified URL.

Thus, there is a need for a convenient method for sharing content displayed on a WAP/i-mode-enabled device with other devices across a network. Further, this method should be independent of and separate from the content applications viewed on the WAP/i-mode-enabled device; i.e., the method for transmitting content corresponding to a deck should not require modification of the deck to enable the functionality of transmitting the corresponding content. Moreover, there is a need for ensuring that the content accessed by the recipient is the same as that intended to be shared by the transmitter.

SUMMARY OF THE INVENTION

Embodiments of the invention allow the transmission of content from a WAP/i-mode-enabled mobile device to any other device across a network. In one embodiment, an indication of a URL corresponding to content accessed by a WAP/i-mode-enabled mobile device is received. Additionally, a destination address is received from the WAP/i-mode-enabled mobile device. Subsequently, an indication of the URL corresponding to the content is transmitted to the destination address.

BRIEF DESCRIPTION OF THE DRAWINGS

FIG. 3-a shows an example of a GUI on a WAP/i-mode-enabled mobile device that displays the bookmarking functionality options.

FIG. 3-b shows an example of a GUI on a WAP/i-mode-enabled mobile device that displays further bookmarking functionality options.

DETAILED DESCRIPTION OF THE INVENTION

Embodiments of the invention allow the transmission of content from a WAP/i-mode-enabled mobile device to any other device across a network. In an embodiment, a URL corresponding to content accessed by the WAP/i-mode-enabled mobile device is transmitted to an application server. The WAP/i-mode-enabled mobile device further transmits a destination address to the application server. The application server then transmits the URL corresponding to the content to the destination address. The URL can then be used to render the corresponding content at the destination address. In another embodiment, the content corresponding to a URL may be transmitted instead of the URL.

1. System and Components

Figure 1:
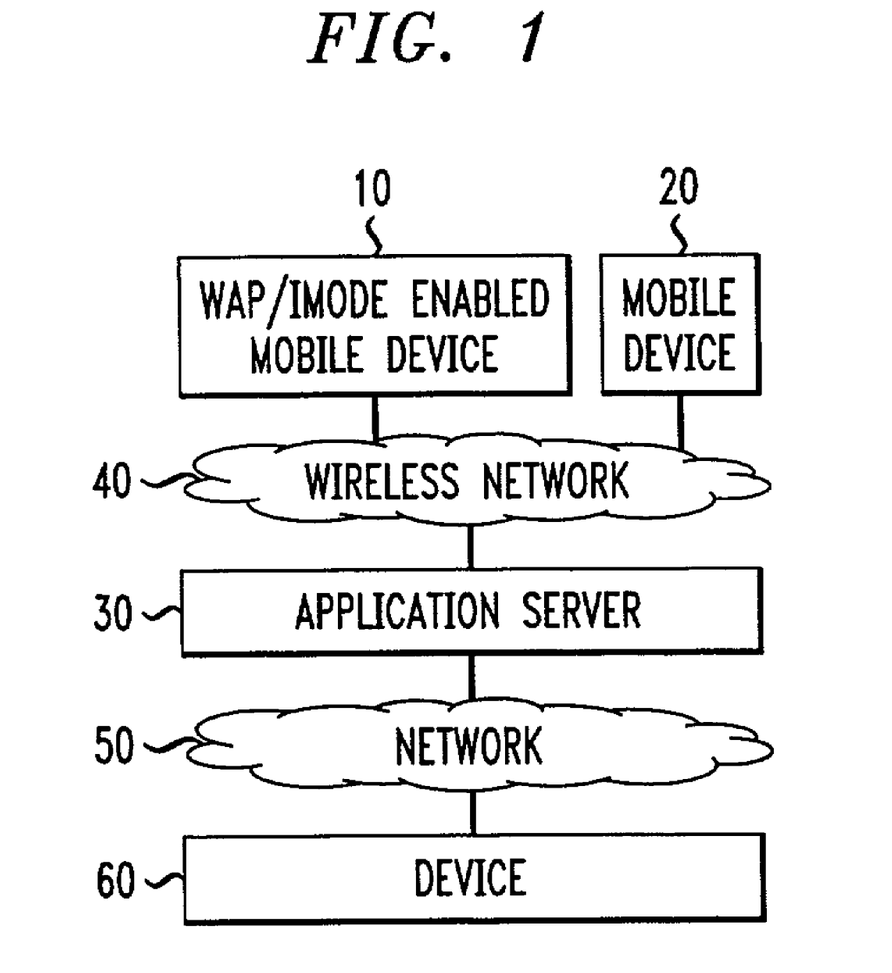
FIG. 1 is a block diagram of a system in accordance with the present invention.

FIG. 1 illustrates a system suitable for use with embodiments of the present invention. In FIG. 1, WAP/i-mode-enabled mobile device 10, mobile device 20 and application server 30 are connected to wireless network 40. WAP/i-mode-enabled mobile device 10 may be a mobile device that runs a microbrowser and that supports WML, WMLScript and/or cHTML. Mobile device 20 may be any device that is capable of wireless communication on network 40, including a device that implements WAP and/or i-mode. Wireless network 40 is a network that is capable of carrying wireless communications over its nodes.

Application server 30 runs WAP and/or i-mode applications that enable at least some of the functionality of mobile devices 10 and 20. For example, application server 30 may act as a gateway for mobile devices that are part of wireless network 40 in reaching services on another network, e.g., network 50. In particular, application server 30 may perform relaying services by communicating messages to and from devices attached to wireless network 40 through network 50. Application server 30 may further perform services in connection with translation from communication protocols used in connection with wireless network 40 to translation protocols used in connection with network 50 and vice versa. For example, if network 50 is the Internet, application server 30 may be capable of translating communications received from wireless network 40 in WAP and/or i-mode into communications utilizing protocols associated with the World Wide Web (e.g., Hypertext Transfer Protocol), and vice versa. Application server 30 may be a web server, or be capable of the functionality of a web server; for example, application server 30 may be capable of executing Common Gateway Interface ("CGI") script, and thus allow a user to interact dynamically with a web server (not shown). Alternatively, or additionally, application server 30 may be capable of running servlets to which a user device may pass data using appropriate servlet script calls. For the purposes of this document, an "invoking script call" shall refer to either a CGI script call, or a servlet script call that is used by a user device to pass data to application server 30. Application server 30 may also run applications in connection with functionality relating to wireless network 40 of mobile devices attached to wireless network 40. For example, application server 30 may run a bookmark application that allows the user of a WAP/i-mode-enabled network device like WAP/i-mode-enabled mobile device 10 to store desired URLs as bookmarks that may be accessed at a later time. Such a bookmark application can be controlled by the user of WAP/i-mode-enabled mobile device 10 through a graphical user interface ("GUI") displayed on WAP/i-mode-enabled mobile device 10.

Network 50 may be the Internet, an Intranet, or any other network capable of carrying network communications. Device 60 is a device attached to network 50 that is capable of receiving and/or transmitting communications through network 50. For example, if network 50 is the Internet, device 60 may be a personal computer connected to the Internet. Any device connected to either wireless network 40 or network 50 will have a network address that enables it to communicate with other devices connected to wireless network 40 and/or network 50. For example, the network address of mobile device 20 may be a wireless telephone number, whereas the network address of device 60 may be an e-mail address, a URL, an IP address, or an instant messaging address, if network 50 is the Internet.

2. Overview of Certain Embodiments of the Invention

Embodiments of the invention allow the convenient transmission of a URL or content corresponding to a URL from a WAP/i-mode-enabled mobile device to any other device across a network. In the embodiments discussed below, a URL corresponding to content accessed by the WAP/i-mode-enabled mobile device is transmitted to an application server. The WAP/i-mode-enabled mobile device further transmits a destination address for the content to the application server.

In a first embodiment, the application server then transmits the URL corresponding to the content to the destination address. The URL can then be used to render the corresponding content at the destination address.

In a second embodiment, the application server fetches the content corresponding to the URL and stores it in a cache for subsequent retrieval. The application server further creates a modified URL that effectively acts as a pointer to the data stored in the cache. The application server then transmits the modified URL corresponding to the newly-created deck or web page to the destination device. In a sub-embodiment, the application server may modify the content corresponding to the original URL received from the WAP/i-mode-enabled device and cache the modified content.

In a third embodiment, the application server fetches the content corresponding to the URL and stores it in a cache for subsequent retrieval. The application server then transmits this content to the destination device. In a sub-embodiment, the application server may modify the content corresponding to the URL received from the WAP/i-mode-enabled device and cache the modified content.

Figure 2:
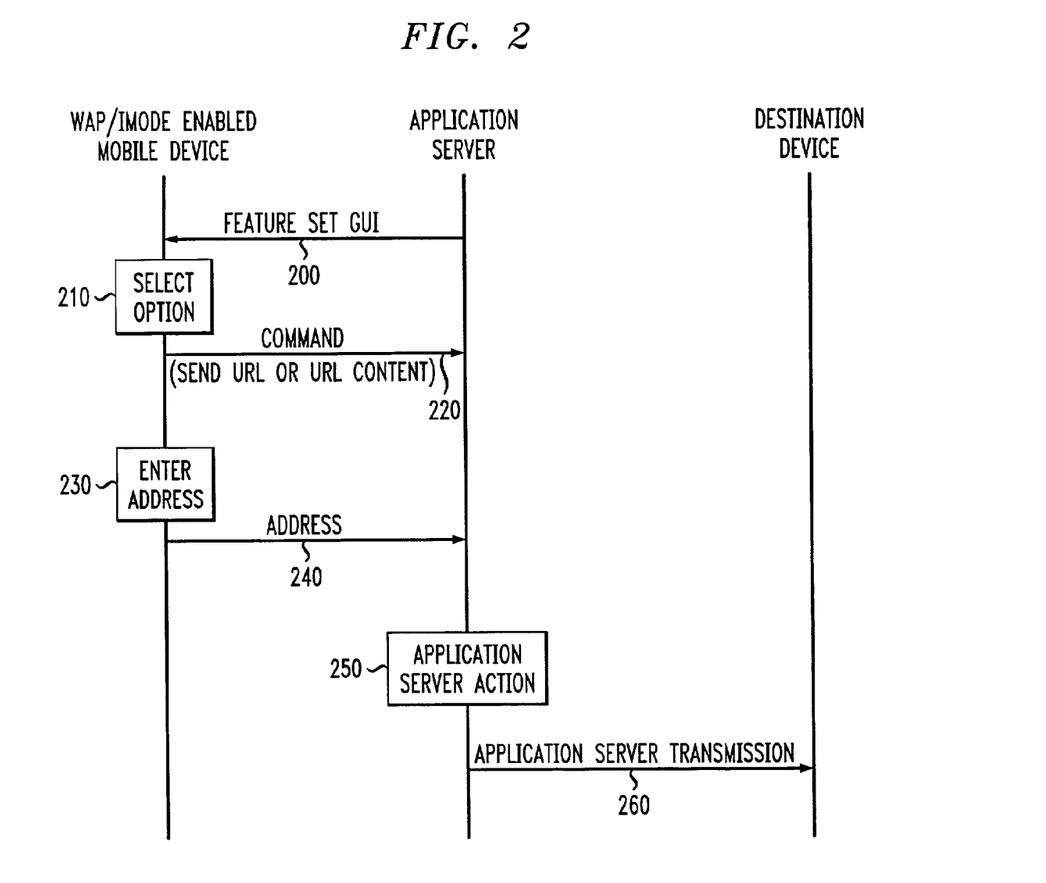
FIG. 2 shows a flow diagram of an embodiment of the present invention in which a URL or content corresponding to a URL is sent from a WAP/i-mode-enabled mobile telephone.

FIG. 2 shows a flow diagram for data flow and process execution in embodiments of the invention. In step 200, code or content for a feature set corresponding to options displayed on the WAP/i-mode-enabled device is transmitted from the application server to the WAP/i-mode-enabled device. For example, a WAP and/or i-mode card containing options that can be selected by the user of the WAP/i-mode-enabled device may be transmitted from the application server and displayed on the WAP/i-mode-enabled device.

Figure 3A:
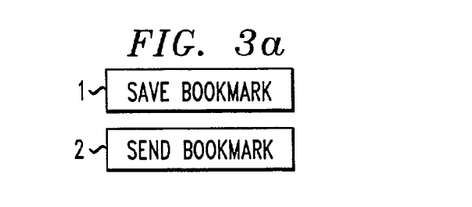
Figure 3B:
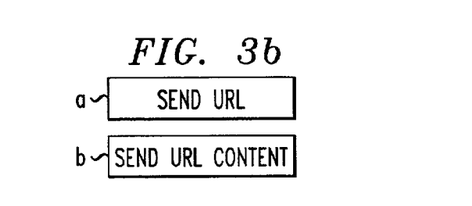

In step 210, the user of the WAP/i-mode-enabled device may select one of the options that were transmitted from the application server and displayed on the WAP/i-mode-enabled device in step 200. In particular, the user may select an option corresponding to the transmission of a URL or content corresponding to a URL to another user. For example, the user may select the "send bookmark" option from among the bookmark application options shown in FIG. 3-*a*. The GUI on the WAP/i-mode-enabled device may then display options including an option for sending a URL and an option for sending content corresponding to a URL, as shown in FIG. 3-*b*. The user may then specify whether the URL, or whether content corresponding to the URL, is to be sent, by selecting from one of these options.

In step 220, a command corresponding to the user's selected option is transmitted from the WAP/i-mode-enabled device to the application server. For example, assuming the user has selected in step 210 the option corresponding to the transmission of a URL or content corresponding to a URL to another user, a command requesting the application server to transmit the URL to another user may be sent to the application server. The command may also include information identifying the URL, such as text containing the URL or a pointer to the URL.

In step 230, the user of the WAP/i-mode-enabled device enters the network address of the user (i.e., the destination address of a destination device corresponding to such user) to whom the URL or content corresponding to the URL is to be sent. The user may enter or select the destination address after being prompted to do so by the GUI displayed on the WAP/i-mode-enabled device.

In step 240, the destination address is transmitted from the WAP/i-mode-enabled device to the application server. The destination address may, for example, be the number for another mobile phone, an e-mail address, a facsimile number, an instant messaging address, an IP address, or any other network address (e.g., a phone number corresponding to Short Message Service).

In step 250, the application server may take further action in connection with the request to transmit the URL or the content corresponding to the URL to the destination address. For example, the application server may fetch and cache the content corresponding to the URL. The application server may also modify the content by, for example, adding advertising to the cached content, or by translating the content corresponding to the URL into a form that can be rendered on the destination device.

In step 260, the application server transmits the URL, a modified URL, or the content corresponding to the URL to the destination device.

Embodiments of the invention allow the transmission of a URL or content corresponding to a URL without requiring any modification to enable the transmission functionality. In particular, embodiments of the invention (unlike the Excite QuickCut service) do not require the addition of a link in content that is desired to be transmitted to enable the transmission functionality. Thus, any URL or content corresponding to a URL may be transmitted in embodiments of the invention without any pre-processing required to enable the transmission functionality. However, as part of the transmission of a URL or content corresponding to a URL, the URL or content corresponding to a URL may be modified (e.g., to add advertising to the URL as described below). Such modification in embodiments of the present invention is performed as part of the process of transmission (as opposed to a step needing to be performed before the transmission), and is not "required" to enable the transmission; i.e., it is an optional feature that allows, for example, the insertion of advertising in connection with the transmission.

Embodiments of the invention, especially embodiments corresponding to variations in steps 250 and 260, are discussed in further detail below.

3. The Bookmark Application and its Use in an Embodiment of the Invention

An enhanced bookmark application that runs on application server 30 may be used in embodiments of the invention. The enhanced bookmark application allows the transmission of URLs and/or content corresponding to transmitted URLs, in addition to the bookmarking of URLs. Thus, by modifying the bookmark application program running on the application server, the functionality of mobile devices is greatly enhanced.

The bookmark application normally operates by displaying, in response to a user request, a GUI on WAP/i-mode-enabled mobile device 10 prompting the user to choose whether a displayed URL should be saved as a bookmark. If the user chooses to save the URL as a bookmark, WAP/i-mode-enabled mobile device 10 composes a message containing the URL associated with application server 30 together with the URL to be saved appended as an argument. WAP/i-mode-enabled mobile device 10 transmits the message, which is received by application server 30. The bookmark application, running on application server 30, then saves the URL transmitted as an argument in a list uniquely associated with WAP/i-mode-enabled mobile device 10. Additional information in connection with the saved URL can also be transmitted by the user and stored in the list uniquely associated with WAP/i-mode-enabled mobile device 10 in a similar manner.

The bookmark application itself may be a WAP and/or i-mode construct in that the source code for the bookmark application may be written using WML, WMLScript, and/or cHTML. In this case, the options displayed on the GUI of WAP/i-mode-enabled mobile device 10 correspond to decks containing content that the user may access by selecting.

The bookmark application can be modified such that the options shown in FIG. 3-*a* are displayed on mobile device 10 in response to an input by the user corresponding to a request for use of the bookmarking service. In an implementation in which the bookmark application is a WAP and/or i-mode construct, each option line displayed on mobile device 10 and shown in FIG. 3-*a* may correspond to a deck that may be accessed by a selection of the user of mobile device 10.

If the user selects the "save bookmark" option, the URL that is currently-accessed by mobile device 10 may be saved in the user's area for favorite URLs. For example, if the user is currently accessing the URL:

http://test.com/test.hdml

Then the user's selecting the "save bookmark" option may result in the bookmark application on the home deck being called. The currently-accessed URL and TITLE of the URL can be passed as CGI script arguments (or, more generally, in an invoking script call) appended to the call to the bookmark application:

device:home/bookmark?URL=http://test.com/
test.hdml&TITLE=Testing&Option=save

As shown in the example above, the CGI script argument may also include an indicator that the "save bookmark" option is used (using the statement "Option=save"); additional options that are further described below may also be passed in the CGI script argument in a similar fashion. The bookmark application running on the server may then receive the appended argument and store the corresponding URL in the storage area for the user's favorite URLs.

If the user selects the "send bookmark" option shown in FIG. 3-*a*, then the options shown in FIG. 3-*b* may be displayed on the WAP/i-mode-enabled mobile device. By selecting the "send URL" option, the user may cause a URL accessed by the user of the WAP/i-mode-enabled mobile device to be transmitted to a destination device. By selecting the "send URL content" option, the user may cause content corresponding to a URL accessed by the user of the WAP/i-mode-enabled mobile device to be transmitted to a destination device. Both of these options are described in greater detail below.

4. An Embodiment of the Invention for Sending URLs

In a first embodiment of the invention, the user may send the currently-accessed URL by selecting the "send URL" option. The URL may be sent to the bookmark application in the same manner as that discussed above in connection with the "save bookmark" option, with the exception that the bookmark application may save the URL that was passed in a special location for further transmission. The bookmark application may then cause mobile device 10 to display either the user's list of stored addresses, or may display an interface for manual entry of a network address. The user may then select or enter the network address of the location to which she desires the URL be sent. In response, mobile device 10 may transmit the destination network address to the bookmark application, which may store the address together with the URL that was received earlier. Subsequently, the bookmark application may transmit the URL to the network address received from the user. By selecting the URL displayed on the destination device, the user of the destination device may view the content corresponding to the transmitted URL.

Thus, in this embodiment, a URL corresponding to content that is being accessed on WAP/i-mode-enabled mobile device 10 is transmitted to either another WAP/i-mode-enabled device, or to a device that is connected to another network (e.g., the Internet).

Accordingly, as shown in step 220 of FIG. 2, a command is received from the user device that the user wishes to transmit the currently-accessed URL to another location. For example, in response to an input from the user, mobile device 10 may transmit a command to an application server at a remote location in the network for transmitting the currently-accessed URL. Additionally, the URL that the user wishes to transmit is received from the user device. For example, the user device may transmit the selected option (e.g., using the statement "Option=sendurl") and the currently-accessed URL as CGI script arguments in a call (or, more generally, in an invoking script call) to the bookmark application running on the application server. The bookmark application may parse the received CGI script arguments, extract the URL, and store the extracted URL in temporary storage for further transmission.

In step 230, the user is prompted for a destination address for transmission of the URL. For example, mobile device 10 may display the user's stored address book for selection of a target destination, or may display a GUI for the user's manual input of an address for transmission of the URL. The user may either select a destination address for transmission of the URL from the address book, or may manually type an address into the GUI of mobile device 10 for transmission. Further, the destination address for transmission of the URL is transmitted to and received by the application server. For example, the destination address may be sent by mobile device 10 as a CGI script argument in a call to the bookmark application. The destination address may, for example, be the number for another mobile telephone, an e-mail address, a facsimile number, an instant messaging address, an IP address, or any other network address.

In step 260, the URL is transmitted from the application server to the destination address received in step 240. For example, the URL may be displayed as a link on the destination device that the user can select and to which the user can be subsequently connected. The user of the destination device may click on the displayed URL, which may cause the destination device to display the corresponding content.

5. An Embodiment of the Invention in which Modified URLs are Transmitted

In a second embodiment, a modified URL may be transmitted to the destination device by the application server instead of the original URL received by the application server from the WAP/i-mode-enabled device (i.e., the original URL). The application server may send the modified URL, for example, to ensure that the destination device views content corresponding to the original URL together with advertising inserted by the application server, or to ensure that the destination device is sent content in a format suitable for rendering on the destination device.

In a first sub-embodiment, once the destination address and the URL to be transmitted to the destination address are received, the application server creates a new URL (new deck or web page) that contains a link pointing to the transmitted URL or modifies an existing URL (existing deck or web page) to contain a link to the transmitted URL. Further, the application server may insert advertising into this deck; for example, the message: "this page was forwarded to you courtesy of AT&T Wireless Services" may be inserted. The application server may then transmit the URL corresponding to this newly-created (or newly-modified) deck to the destination address. The user of the destination device may select the URL of the new (or modified) deck to display the deck containing the link to the transmitted URL. The user of the destination device may then access the content corresponding to the URL sent by mobile device 10 as well as the inserted advertisements, by selecting the displayed link. Thus, the first sub-embodiment is a two-step process, because the user of the destination device needs to select a URL (to a new or existing deck) in order to display the deck that contains another URL (or link). The user of the destination device then selects this link in order to access the content associated with the transmitted URL.

In a second sub-embodiment, the application server, after receiving the original URL or a pointer to the original URL from the WAP/i-mode-enabled mobile device, may fetch the content corresponding to the received URL from the network. The application server may then cache the fetched content. The application server may further create a new deck (or web page) or modify a pre-existing deck (or web page) so that the newly-created or newly-modified deck includes or points to the cached content. The application server may then transmit the URL corresponding to this newly-created (or newly-modified) deck to the destination address. The user of the destination device may then access the content corresponding to the original URL by selecting the displayed URL. Thus, the second sub-embodiment is a one-step process, because the user of the destination device selects a single URL (to a new or existing deck) in order to access the content associated with the transmitted URL.

The application server may modify the cached content in the second sub-embodiment, for example, by inserting advertising into the content corresponding to the original URL and by caching such modified content. The user of the destination device, after selecting the URL corresponding to the newly-created or newly-modified deck that is displayed on the destination device, may thus access the modified content.

The application server may also modify the content corresponding to the original URL by translating or reformatting the content such that it can be correctly rendered on the destination device. The application server may then cache such modified content. The user of the destination device, after selecting the URL corresponding to the newly-created or newly-modified deck that is displayed on the destination device, may thus access the modified content.

The application server may determine the correct format or protocol for translation of the content based on its knowledge of the destination device. For example, the application server may determine based on previous transactions with the destination device or through lookup in an appropriate database, the characteristics of the destination device. The application server may then translate the content into a form that can be rendered by the destination device and cache such formatted content.

Alternatively, the application server may form a connection with the destination device and determine the appropriate format for rendering of content on the destination device based on the properties of the connection with the destination device. The application server may then translate the content into a form that can be rendered by the destination device and cache such formatted content.

Figure 4:
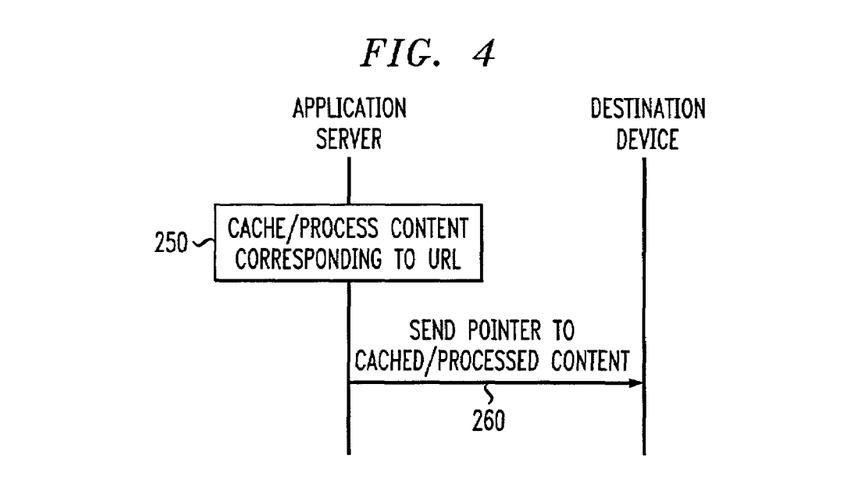
FIG. 4 shows a section of the flow diagram of an embodiment of the present invention in which a modified URL is received by a destination device from a WAP/i-mode-enabled mobile device.

Thus, in this second embodiment, the application server at step 250 of FIG. 2 (and FIG. 4) may take additional action as described above. For example, the application server may cache the content corresponding to the original URL, or may cache a modified version of the content corresponding to the original URL (e.g., by adding advertising and/or translating the content into an appropriate format for rendering on the destination device). The application server may further create a new deck or web page that points to the cached content (or may modify an existing one to point to the cached content.)

The application server at step 260 of FIG. 2 (and FIG. 4) may transmit the URL for the newly-created (or newly-modified) deck or web page to the destination address received in step 240. For example, this URL may be displayed as a link on the destination device that the user can select and to which the user can be subsequently connected. The content of the deck (including any advertising) can be displayed on the destination device.

6. An Embodiment of the Invention in which Content is Transmitted

Some destination addresses, for example, facsimile and/or e-mail addresses, do not allow the direct retrieval of content based on a transmitted URL. For such destination addresses, content displayed at mobile device 10 may have to be transmitted directly, rather than indirectly, using the URL corresponding to the content. Furthermore, the user of mobile device 10 may wish to directly transmit content displayed on mobile device 10, whether or not the destination device is capable of rendering content corresponding to a URL. In such cases, content displayed on WAP/i-mode-enabled mobile device 10 may be sent to the destination device through the application server, in a manner similar to that disclosed for the transmission of a URL.

The user of mobile device 10 may signal her desire to transmit content displayed on mobile device 10 by, for example, selecting the option "send URL content" shown on FIG. 3-b from the bookmark option list displayed on mobile device 10. Mobile device 10 may transmit the selected option (e.g., by including the statement "Option=sendurlcontent" in an invoking script call), the URL corresponding to the displayed content, and the destination address to the application server in the manner disclosed earlier. In response, the application server may fetch the corresponding content and then transmit this content to the destination device for rendering.

The application server, before transmitting the content to the destination device, may also modify the content corresponding to the received URL by translating or reformatting the content such that it can be correctly rendered on the destination device. The user of the destination device may thus access modified content that can be correctly rendered on the destination device.

The application server may determine the correct format or protocol for translation of the content based on its knowledge of the destination device. For example, the application server may determine the characteristics of the destination device based on previous transactions with the destination device, or through lookup in an appropriate database. The application server may then translate the content into a form that can be rendered by the destination device and cache such formatted content. For example, if the destination address is a computer connected to the Internet and capable of rendering HTML, then HTML-content may be transmitted from the application server to the destination address. However, if the destination address is a telephone number corresponding to a facsimile device, the content corresponding to the URL may be translated by the application server into a format appropriate for facsimile transmission, and transmitted using the appropriate facsimile protocol. If the destination address is an e-mail address, the bookmark application may send the content as a text attachment to an e-mail message, or may include the content as text in the body of the e-mail.

Alternatively, the application server may form a connection with the destination device and determine the appropriate format for rendering of content on the destination device based on the properties of the connection with the destination device. The application server may then translate the content into a form that can be rendered by the destination device and cache such formatted content.

In yet another alternative, the application server may translate the content into a plurality of different formats and transmit the differently-formatted versions to the destination device. Then, the destination device (or the user of the destination device) may choose from among the differently-formatted versions a proper one for rendering on the destination device.

Figure 5:
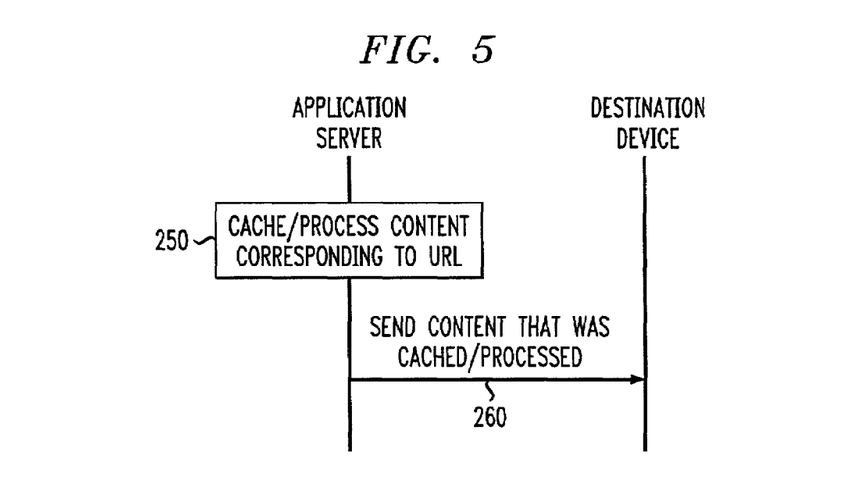
FIG. 5 shows a section of the flow diagram of an embodiment of the present invention in which content or modified content corresponding to a URL is received by a destination device from a WAP/i-mode-enabled mobile device.

In this third embodiment, at step 250 of FIG. 2 (or FIG. 5), the application server fetches the content corresponding to the URL received from the WAP/i-mode-enabled mobile device and creates a message containing the content in the body or as an attachment. At this step, the bookmark application may optionally insert advertising into the message or in an attachment to the message. The bookmark application may further translate the content corresponding to the received URL into a format that can be correctly rendered on the destination device, and insert this translated content into the message or into the attachment for the message.

In step 260 of FIG. 2 (or FIG. 5), the application server transmits the message containing the content (or the modified content) to the destination device. The user of the destination device, by accessing the received message, will thus access the content (or the modified content) corresponding to the URL transmitted from the WAP/i-mode-enabled device to the application server.

7. An Embodiment of the Invention in which a Gateway Distinct from the Application Server is Utilized In an embodiment of the invention, the functionality associated with translation between and among protocols is located in a gateway that is physically separate from the application server. In this embodiment, when mobile device 10 transmits a URL to the application server for transmission to a destination device, the gateway translates the content associated with the URL into a format that can be rendered by the destination device. The gateway may determine the correct format for the destination device from the destination address, which is the network address of the destination device. For example, the gateway may determine that a destination address is a facsimile machine, if the destination address is given as a phone number. Alternatively, the gateway may access a database that contains tables of network addresses and device types. By table lookup in this database, the gateway may determine that a received destination address corresponds to a device capable of receiving documents or images coded using a predetermined format. The gateway may then translate the content corresponding to the URL into a format supported by the destination device and transmit the translated content to the destination address.

8. An Embodiment in which Content Displayed at a Given Time is Transmitted

The content corresponding to a URL may be changed during the time interval between the transmission of the URL address by mobile device 10 and the time at which the user of the destination device invokes the received URL at the destination device. Consequently, the content displayed on the destination device may differ from that originally displayed on mobile device 10. In many cases, the user of mobile device 10 will want the destination device to display updated versions of the content corresponding to the transmitted URL. However, in certain instances, the user of mobile device 10 may want the recipient to access the exact same content as that originally accessed by the user of mobile device 10. For these cases, an option may be added to the list of options displayed on the user device and shown on FIG. 3-*b* having, for example, the title, "send URL with state at present time." If the user selects this option, then the application server may store the content corresponding to the URL at that time in a newly-created deck (or in an existing deck). The application server may then transmit the URL corresponding to this deck to the destination device. The destination device would then display this link. The user of the destination device may receive the original content by selecting, at any time, the displayed link. Thus, the destination device will display content corresponding to that intended to be transmitted by the user of mobile device 10; that is, the content of the URL transmitted by the user of mobile device 10, at the time that user transmitted the URL.

9. Embodiments in which Indications of URLs are Transmitted

In the embodiments discussed above, indications of URLs may be transmitted instead of actual URLs. An indication of a URL may be the actual URL, a pointer to the URL, or any other way of indicating the URL without explicitly including the URL. Thus, instead of the transmission to the bookmark application of the actual URL corresponding to content displayed on mobile device 10, a pointer pointing to this URL can be transmitted by mobile device 10 in embodiments of the invention. Further, instead of the transmission to the destination device of an actual URL, a pointer pointing to a URL can be transmitted by the bookmark application in embodiments of the invention. Such embodiments are within the scope of the disclosed invention.

10. Embodiments Stored in Computer-readable Medium

Figure 6:
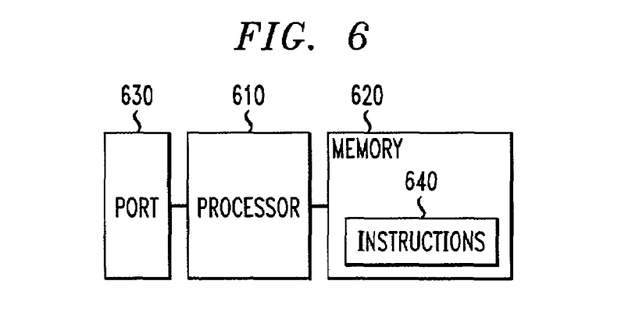
FIG. 6 shows a computer-readable medium embodiment of the present invention.

FIG. 6 illustrates computer-readable medium embodiment of the present invention. In FIG. 6, processor 610 is coupled to port 630 and memory 620. Port 630 may be any type of port used for input or output; in particular, any output of a process executed by processor 610 can be transmitted through port 630. Memory 620 is a computer-readable medium that can store instructions 640 that are adapted to be executed by processor 610. In particular, memory 620 can store instructions 640 corresponding to any method embodiments of the present invention. Specifically, memory 620 can store instructions 640 corresponding to the method embodiments of the present invention discussed in this disclosure.

11. Applications Other Than the Bookmark Application may be Used in Embodiments An application other than the bookmark application may be used in embodiments of the invention. Any application running on the application server that is capable of displaying user options as decks on mobile device 10 may be used for this purpose. Modifications to such applications similar to the modifications disclosed above in the context of the bookmark application may be performed to enable the transmission of URLs and corresponding content. Such embodiments are within the scope of the present invention.

In one embodiment, a URL that has been stored as a bookmark (and that had been previously-accessed) may be transmitted to a destination device directly from a list of bookmarks without re-accessing the bookmark. The URL may be stored as a bookmark either on the WAP/i-mode-enabled mobile device or on the application server. To transmit a previously-accessed bookmark that is saved in the bookmark list, the user may select a corresponding option from a menu displayed on the WAP/i-mode-enabled mobile device (using the bookmark viewing application). The user may select the bookmark for transmission from the list of bookmarks displayed on the device, and may also select an option for transmission, such as "send URL" or "send content corresponding to URL", as described above. The device may then pass the bookmarked URL and the selected option as arguments in an invoking script call to the application server as described above. The URL or the content corresponding to the URL may then be transmitted by the application server to the destination device in the manner described above. Furthermore, more than one URL in the bookmark list, or content corresponding to more than one URL in the bookmark list, may be transmitted by the user's selection of a plurality of URLs from the URLs residing in the bookmark list. Such modifications are within the scope of the disclosed invention.

12. URLs or Content Corresponding to URLs May be Sent to More Than One User

The embodiments described above may be modified to allow the transmission of URLs or content corresponding to URLs to more than one destination device. Such modifications may be made by those skilled in the art in light of the disclosures herein, and are within the scope of the embodiments of the invention that were described.

13. Sending URLs or Content Corresponding to URLs from History Stack

In embodiments of the invention, a URL (or the URL's content) may be transmitted to a destination device for URLs that have been previously-accessed by the sending user. Such URLs are stored in a history stack either on the WAP/i-mode-enabled mobile device or on the application server. Using the history stack, the sending user may access a previously-accessed URL by selecting the corresponding option from a menu displayed on the WAP/i-mode-enabled mobile device. Additionally, the previously-accessed URL can be passed as an argument to the bookmark application as described above. Thus, the embodiments discussed earlier may be modified to send a previously-accessed URL or the content corresponding to a previously-accessed URL to destination devices. Furthermore, more than one URL in the history stack, or content corresponding to more than one URL in the history stack, may be transmitted by the user's selection of a plurality of URLs from the URLs residing in the history stack. Such modifications are within the scope of the disclosed invention.

14. An Embodiment in Which the Application Server Resides in the User Device

In an embodiment of the present invention, the application server may reside in the WAP/i-mode-enabled mobile device. In such embodiments, the application server, running on the user device, may perform the functionality of the application server described in the embodiments above. Such modifications are within the scope of the present invention.

15. Messaging in Connection with Transmission of Content

Embodiments of the invention allow users of WAP/i-mode-enabled devices to send a URL or content corresponding to a URL to various destination addresses. After invoking the "bookmark" application by selecting the necessary links on the WAP/i-mode-enabled device, the user may be given a choice between the "Save Bookmark" option and the "Send Bookmark" option. If the user selected the "Send Bookmark" option, the user is prompted for a destination addresses. Before or after the user's selection of an option, the user could also be prompted to enter a customized message (e.g., using the keypad on the phone) or to select from a list of canned messages (e.g., from among messages including "call me right away" or "thanks"). The message entered or selected by the user may be transmitted together with the URL or URL content, and could be rendered by the destination device together with the transmitted URL or URL content. In a similar fashion, advertisements could be inserted into the overall message as discussed above.

16. Conclusion

As described above, the various embodiments of the present invention describe a method and system for transmitting URLs or content corresponding to URLs displayed on WAP/i-mode-enabled mobile device to any other device connected to a network. Additional benefits accruing from embodiments of the invention include simply and efficiently implementing the sharing of content displayed on a WAP/i-mode-enabled device using pre-existing features of WAP/i-mode-enabled devices. Furthermore, embodiments of the invention allow the transmission of a URL or content corresponding to a URL without requiring any modification to enable the transmission functionality. In particular, embodiments of the invention do not require the addition of a link in content that is desired to be transmitted to enable the transmission functionality. Thus, any URL or content corresponding to a URL may be transmitted without any pre-processing required to enable the transmission functionality.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for transmitting content, or information related to the content, from a first WAP/i-mode-enabled device to a second WAP/i-mode-enabled device, the method comprising:

receiving a command from a first WAP/i-mode-enabled device for transmission of a first URL that is accessed by the first device, wherein the first device has received content associated by the first URL;

receiving a destination address for transmission of the first URL, wherein the destination address is associated with the second device;

generating a message including an indication of the second URL, wherein the second URL corresponds to the content received by the first device; and transmitting the message to the destination address, wherein the message can be used to access the content by the second device associated with the destination address.

2. The method of claim 1 wherein the first URL and the second URL are identical.

3. The method of claim 1 wherein the command includes an invoking script call containing the first URL as an argument.

4. The method of claim 1 wherein the indication is a pointer to the second URL, and a file associated with the second URL includes a pointer to the first URL.

5. The method of claim 4 wherein the file associated with the second URL contains advertising.

6. The method of claim 1 wherein the indication is a pointer to the second URL.

7. The method of claim 1 wherein the indication includes the second URL.

8. The method of claim 1 wherein the first URL is currently-accessed by the WAP/i-mode-enabled device.

9. The method of claim 1 wherein the content corresponding to the first URL is cached.

10. The method of claim 9 wherein a file corresponding to the second URL includes the cached content.

11. The method of claim 9 wherein a file corresponding to the second URL includes a modified version of the cached content.

12. The method of claim 11 wherein the modified version of the cached content includes advertising.

13. The method of claim 11 wherein the modified version of the cached content is in a format capable of being rendered on a destination device at the destination address.

14. The method of claim 13 wherein the format for the modified version of the cached content is selected based on the destination device.

15. The method of claim 1 wherein the first URL is a previously-accessed URL and is retrieved from a history stack prior to the receiving of the command.

16. The method of claim 1 wherein the first URL is a previously-accessed URL and is retrieved from a list of bookmarks prior to the receiving of the command.

17. The method of claim 1 wherein the WAP/i-mode-enabled device is a device that is WAP-enabled, but not i-mode-enabled.

18. The method of claim 1 wherein the WAP/i-mode-enabled device is a device that is i-mode-enabled, but not WAP-enabled.

19. A method for transmitting content from a WAP/i-mode-enabled device, the method comprising:
   receiving a command from a WAP/i-mode-enabled device for transmission of a first URL that is accessed by the device;
   receiving a destination address for transmission of the first URL;
   generating a message including an indication of a second URL, a file associated with the second URL including a modified version of the content corresponding to the first URL; and
   transmitting the message to the destination address.

20. A method for transmitting content from a WAP/i-mode-enabled device, the method comprising:
   receiving a first URL from a WAP/i-mode-enabled device in a command including an invoking script call;
   receiving a destination address for transmission of the first URL;
   generating a message including a pointer to a second URL, wherein the pointer, second URL, or both relate to data accessible via the first URL; and
   transmitting the message to the destination address to permit a device associated with the second address to access the data.

21. The method of claim 20 wherein the first URL and the second URL are identical.

22. The method of claim 20 wherein a file associated with the second URL contains a pointer to the first URL.

23. The method of claim 20 wherein a file associated with the second URL contains advertising.

24. The method of claim 20 wherein a file associated with the second URL contains a modified version of the content corresponding to the first URL.

25. The method of claim 24 wherein the modified version of the content is in a format suitable for rendering on a destination device at the destination address.

26. The method of claim 20 wherein the first URL is a previously-accessed URL and is retrieved from a history stack prior to the receiving of the command.

27. The method of claim 20 wherein the first URL is a previously-accessed URL and is retrieved from a list of bookmarks prior to the receiving of the command.

28. The method of claim 20 wherein the WAP/i-mode-enabled device is a device that is WAP-enabled, but not i-mode-enabled.

29. The method of claim 20 wherein the WAP/i-mode-enabled device is a device that is i-mode-enabled, but not WAP-enabled.

30. A method for transmitting content, or information related to the content, from a WAP/i-mode-enabled device, the method comprising:
   receiving a command from a WAP/i-mode-enabled device for transmission of content corresponding to a URL;
   receiving a destination address for transmission of the content;
   storing the content for subsequent retrieval;
   generating a message including the content; and
   transmitting the message to the destination address, without any required pre-processing of the content or the URL to enable the transmission.

31. The method of claim 30 wherein the content includes advertising inserted by an application server.

32. The method of claim 30 wherein the content is translated into a format different from the format of the content rendered on the WAP/i-mode-enabled device, before inclusion of the content into the message.

33. The method of claim 32 wherein the format into which the content is translated can be properly rendered by a destination device at the destination address.

34. The method of claim 33 wherein the format into which the content is translated is selected based on the destination device at the destination address.

35. The method of claim 34 wherein the format into which the content is translated is selected based on a connection with the destination device at the destination address.

36. The method of claim 30 wherein the URL is a previously-accessed URL and is retrieved from a history stack prior to the receiving of the command.

37. The method of claim 30 wherein the URL is a previously-accessed URL and is retrieved from a list of bookmarks prior to the receiving of the command.

38. The method of claim 30 wherein the WAP/i-mode-enabled device is a device that is WAP-enabled, but not i-mode-enabled.

39. The method of claim 30 wherein the WAP/i-mode-enabled device is a device that is i-mode-enabled, but not WAP-enabled.

40. A computer-readable medium having stored thereon instructions adapted to be executed by a processor, the instructions, which when executed, initiate the transmission of content, or information related to the content, from a first WAP/i-mode-enabled telecommunications device to a second telecommunications device, the instructions including:
   receiving a command from a WAP/i-mode-enabled device that a URL accessed by the device will be transmitted, wherein the URL corresponds to content the first WAP/i-mode-enabled telecommunications device wishes to share with the second telecommunications device;

receiving a destination address for transmission of the URL to the second telecommunications device, wherein the destination address is associated with the second telecommunications device;

generating a message including an indication of the URL; and transmitting the message to the destination address, wherein the message can be used to access the content by the second telecommunications device.

41. A computer-readable medium having stored thereon instructions adapted to be executed by a processor, the instructions, which when executed, initiate the transmission of content, or information related to the content, from a WAP/i-mode-enabled device, the instructions including:

receiving a command from a WAP/i-mode-enabled device for transmission of a first URL that is accessed by the device, wherein the URL corresponds to content accessed by the device;

receiving a destination address for transmission of the content or the first URL;

storing the content, or revised version of the content, for subsequent retrieval;

generating a message including an indication of a second URL, or pointer, to the content; and transmitting the message to the destination address to permit a device associated with the destination address to access the stored content.

42. A computer-readable medium having stored thereon instructions adapted to be executed by a processor, the instructions, which when executed, initiate the transmission of content, or information related to the content, from a WAP/i-mode-enabled device, the instructions including:

receiving a command from a WAP and i-mode-enabled device, or just i-mode enabled device, for transmission of content associated with a URL that is accessed by the device;

receiving a destination address for transmission of the URL or the content corresponding to the URL;

storing the content, or modified version of the content, for subsequent retrieval generating a message including the content, or modified version of the content, corresponding to the URL; and transmitting the message to the destination address.

* * * * *